United States Patent
Shiraki et al.

(10) Patent No.: US 8,520,122 B2
(45) Date of Patent: Aug. 27, 2013

(54) LENS DRIVING DEVICE, AUTOFOCUS CAMERA, AND CAMERA-EQUIPPED MOBILE TERMINAL

(75) Inventors: Manabu Shiraki, Kanagawa (JP); Satoshi Asakawa, Kanagawa (JP); Koji Toyama, Kanagawa (JP)

(73) Assignee: New Shicoh Technology Co., Ltd., Kanagawa (JP)

(*) Notice: Subject to any disclaimer, the term of this patent is extended or adjusted under 35 U.S.C. 154(b) by 325 days.

(21) Appl. No.: 12/855,297

(22) Filed: Aug. 12, 2010

(65) Prior Publication Data

US 2011/0039599 A1 Feb. 17, 2011

(30) Foreign Application Priority Data

Aug. 17, 2009 (JP) ................................ 2009-188630
Sep. 28, 2009 (JP) ................................ 2009-221768

(51) Int. Cl.
*H04N 5/225* (2006.01)
*H04N 5/228* (2006.01)
*H04N 5/232* (2006.01)
*G02B 7/02* (2006.01)

(52) U.S. Cl.
USPC ....... 348/335; 348/208.11; 348/345; 359/824

(58) Field of Classification Search
USPC .............. 348/345, 208.11, 208.4, 208.7, 335; 396/55, 144; 359/557, 824
See application file for complete search history.

(56) References Cited

U.S. PATENT DOCUMENTS

| | | | | |
|---|---|---|---|---|
| 7,295,388 B2* | 11/2007 | Shyu et al. | .................... | 396/133 |
| 7,612,957 B1* | 11/2009 | Wu et al. | ........................ | 359/824 |
| 7,725,014 B2* | 5/2010 | Lam et al. | ................. | 348/208.11 |
| 7,782,559 B2* | 8/2010 | Huang et al. | .................. | 348/345 |
| 8,249,440 B2* | 8/2012 | Fan et al. | ................. | 348/208.11 |
| 2006/0034599 A1* | 2/2006 | Osaka | ............................ | 396/144 |
| 2009/0059373 A1* | 3/2009 | Lam et al. | ..................... | 359/557 |
| 2010/0080545 A1* | 4/2010 | Fan et al. | ................. | 348/208.11 |

FOREIGN PATENT DOCUMENTS

| | | |
|---|---|---|
| CN | 101384954 A | 3/2009 |
| CN | 101498826 A | 8/2009 |
| JP | 2007-068273 | 3/2007 |
| JP | 2007068273 A | 3/2007 |
| WO | 2008/128407 | 10/2008 |

* cited by examiner

*Primary Examiner* — Nhan T Tran
(74) *Attorney, Agent, or Firm* — Dilworth & Barrese, LLP.

(57) ABSTRACT

A lens driving device, an autofocus camera and a camera-equipped mobile terminal are provided that can correct movement of a lens in an optical axis direction and tilt of an optical axis, and reduce the dimension thereof in the optical axis direction. The device includes: a lens support 5 for supporting a lens at an inner circumference; a plurality of coils 19a to 19d disposed at regular intervals in a circumferential direction on an outer periphery of the lens support 5; a base 8 that supports the lens support 5 so as to move freely in an optical axis direction of the lens; and a magnet portion 17 provided on the base 8 and facing each of the coils 19a to 19d, in which an electric current of equal current value is applied to each of the coils 19a to 19d when moving the lens support 5 in the optical axis direction, and current values of the electric current applied to predetermined coils 19a to 19d are varied when correcting tilt of the optical axis of the lens.

8 Claims, 6 Drawing Sheets

LENS DRIVING DEVICE, AUTOFOCUS CAMERA, AND CAMERA-EQUIPPED MOBILE TERMINAL

This application is based on and claims the benefit of priority from Japanese Patent Applications No. 2009-221768, filed on 28 Sep. 2009 and No. 2009-188630, filed on 17 Aug. 2009, the content of which are incorporated herein by references.

FIELD OF THE INVENTION

The present invention relates to a lens driving device, an autofocus camera, and a camera-equipped mobile terminal. The mobile terminal refers to a cellular phone, a personal digital assistant (PDA), a notebook computer, etc.

RELATED ART

Patent Document 1 discloses that a plurality of magnets are fixed at intervals in a circumferential direction on an outer periphery of a lens support, a yoke (fixed member) supporting the lens support so as to move freely in an optical axis direction is provided with coils in positions that face the magnets, and an electric current applied to each coil is controlled, thereby tilting the lens support such that the linear movement (movement in the optical axis direction) of the lens support and the tilt of the optical axis are corrected.

PRIOR ART DOCUMENT

Patent Document

Patent Document 1: International Application Publication No. WO2008/128407

SUMMARY OF THE INVENTION

Problems to be Solved by the Invention

However, in the technique of Patent Document 1, the coils are rolled in the shape of a cylinder, a center line of the cylinder is made parallel with the optical axis, and the magnets are disposed so as to face the edge of the cylinder; therefore, there is a problem that the dimension in the optical axis direction (front-back direction) of the lens driving device is increased.

Accordingly, it is an object of the present invention to provide a lens driving device, an autofocus camera and a camera-equipped mobile terminal that can correct movement of a lens in an optical axis direction and tilt of an optical axis, and reduce the dimension thereof in the optical axis direction.

A first invention is a lens driving device that includes: a lens support for supporting a lens in an inner circumference; a plurality of coils disposed at regular intervals in a circumferential direction on an outer periphery of the lens support; a fixed member that disposes the lens support in the inner circumference, and supports the lens support so as to move freely in an optical axis direction of the lens; and magnet portions that are provided to the fixed member, and face the coils, respectively, in which an electric current of equal current value is applied to each of the coils when moving the lens support in the optical axis direction, and current values of the electric current applied to predetermined coils are varied when correcting tilt of the optical axis of the lens.

According to the first invention, the plural coils are disposed on the outer periphery of the lens support, the magnet portions are fixed to the fixed member so as to face the coils, and a coil and a magnet are not disposed in the optical axis direction of the lens unlike the prior art; therefore, the dimension of the optical axis direction of the lens support can be reduced as compared to the prior art.

Moreover, according to the first invention, since the optical axis correction can be easily performed, the accuracy and assembly accuracy of the lens support and the parts, etc. holding the lens support so as to move freely can be reduced, and in addition, defects of the parts and defects of the lens driving device can be reduced.

A second invention is a lens driving device that includes: a lens support for supporting a lens in an inner circumference; a plurality of magnet portions disposed at regular intervals in a circumferential direction on an outer periphery of the lens support; a fixed member that disposes the lens support in the inner circumference, and supports the lens support so as to move freely in an optical axis direction; and plural coils that are provided to the fixed member, and face the magnet portions of the lens support, respectively, in which an electric current of equal current value is applied to each of the coils when moving the lens support in the optical axis direction, and current values of the electric current applied to predetermined coils are varied when correcting tilt of the optical axis of the lens.

According to the second invention, the magnet portions are disposed on the outer periphery of the lens support, the plural coils are fixed to the fixed member so as to face the magnet portions, and a coil and a magnet are not disposed in the optical axis direction of the lens unlike the prior art; therefore, the dimension of the optical axis direction of the lens support can be reduced as compared to the prior art.

In addition, according to the second invention, since the optical axis correction can be easily performed, the accuracy and assembly accuracy of the lens support and the parts, etc. holding the lens support so as to move freely can be reduced, and in addition, defects of the parts and defects of the lens driving device can be reduced.

In the first and second inventions, it is preferable that each of the coils is substantially rectangular when viewed laterally, and includes a first side portion and a second side portion in the optical axis direction; the magnet portions include a first side magnet that faces the first side portion of each of the coils, and a second side magnet that faces the second side portion of each of the coils; and magnetic poles of the first side magnet and the second side magnet are different from each other.

By doing so, the first side portion and the second side portion in the optical axis direction of the toroidal coils can be utilized together as a thrust generating portion, thereby making it possible to obtain high thrust at a low current value.

A third invention is an autofocus camera, including: the lens driving device according to any one of the first and second inventions; and an image sensor that is provided to an image formation side of the lens of the lens support, in which a current value applied to each of the coils is controlled so as to detect a peak of high frequency components of the image sensor.

A fourth invention is a camera-equipped mobile terminal, including the autofocus camera according to the third invention.

DETAILED DESCRIPTION OF THE INVENTION

A first embodiment of the present invention is described as follows in detail with reference to FIGS. 1 to 7. A lens driving device 1 according to the present embodiment is a lens driving device of an autofocus camera incorporated into a cellular phone.

Figure 5:
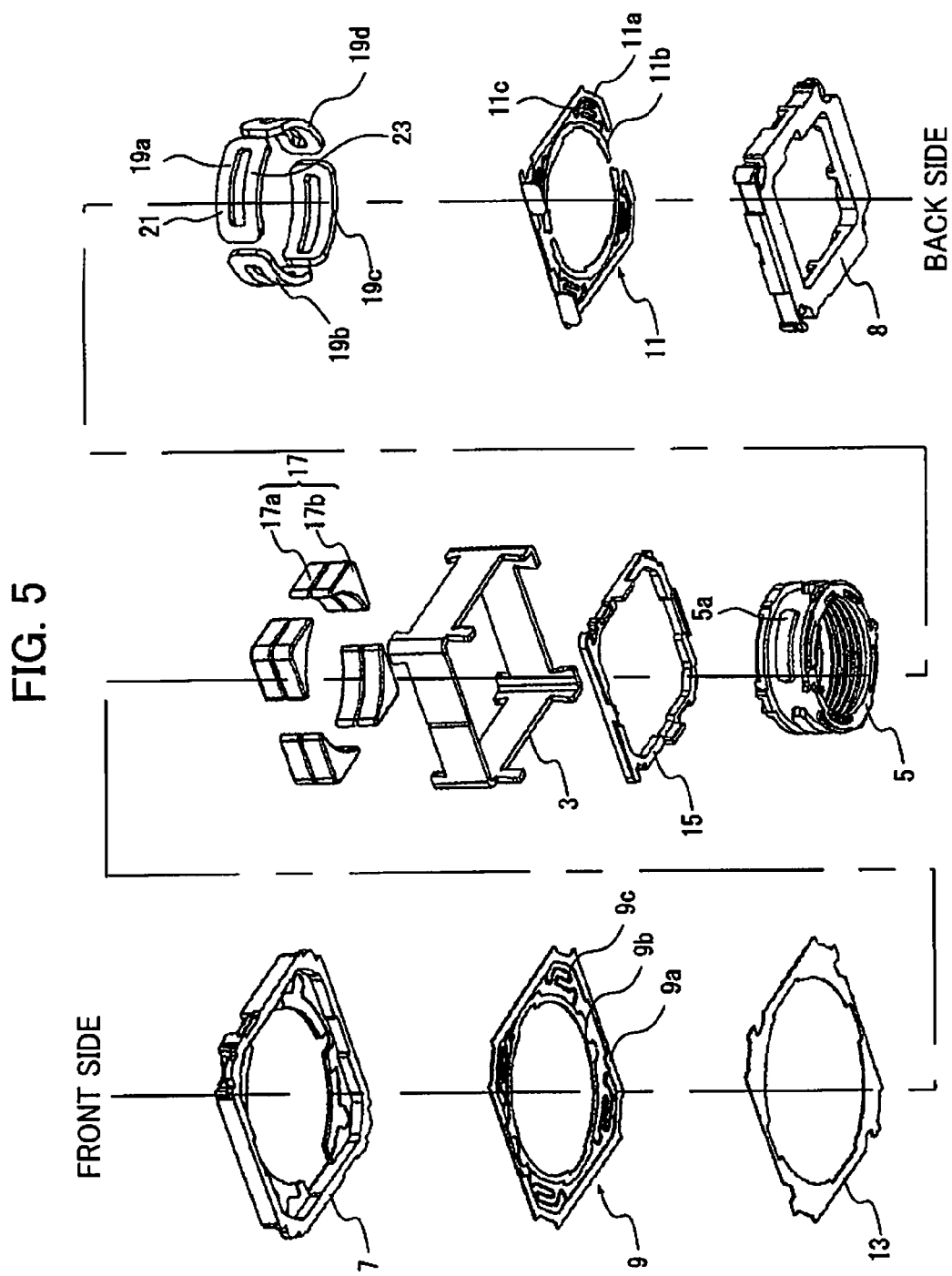
FIG. 5 is an exploded perspective view of the lens driving device according to the first embodiment.
Figure 6:
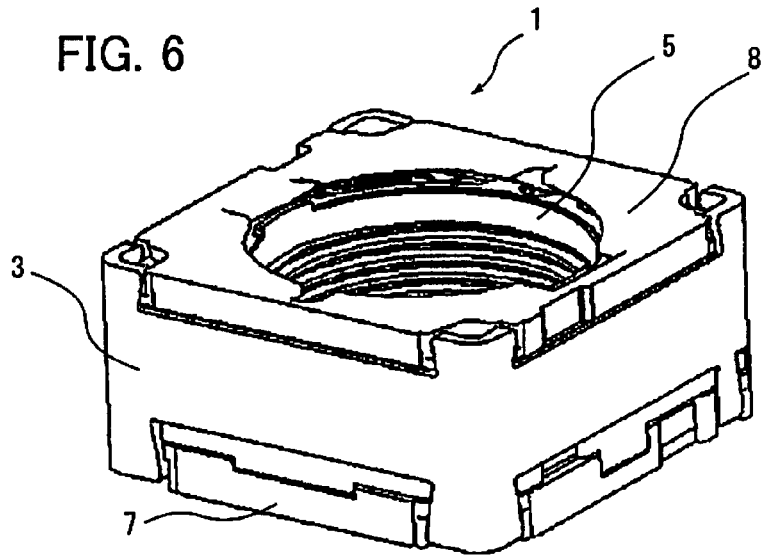
FIG. 6 is a perspective view showing the exterior of the lens driving device according to the first embodiment.

As shown in FIG. 5, the lens driving device 1 includes: a barrel shaped yoke 3; a lens support 5; a frame 7 and a front side spring 9 disposed on a front side in an optical axis direction of the yoke 3; and a base 8 and a back side spring 11 disposed on a back side of the yoke 3, in which a front side spacer (insulator) 13 is disposed between the front side spring 9 and the yoke 3, and a back side spacer (insulator) 15 is disposed between the back side spring 11 and the yoke 3.

In the present embodiment, the frame 7, the yoke 3 and the base 8 are fixed members.

The yoke 3 is shaped like a substantially square barrel, a magnet portion 17 is provided to each of four corners of an inner circumferential side of the yoke 3, and each magnet portion 17 is configured with a front side magnet (first side magnet) 17a and a back side magnet (second side magnet) 17b superimposed in a front-back direction.

Each of the magnets 17a and 17b is substantially shaped like a triangle as seen in a plane viewed from the front side, and an inner circumferential side thereof is shaped like a circular arc along the periphery of the lens support 5. For example, an inner circumferential side of the front side magnet 17a is the north pole, and an inner circumferential side of the back side magnet 17b is the south pole, so that the magnetic poles thereof on the inner circumferential side are different from each other.

Figure 3:
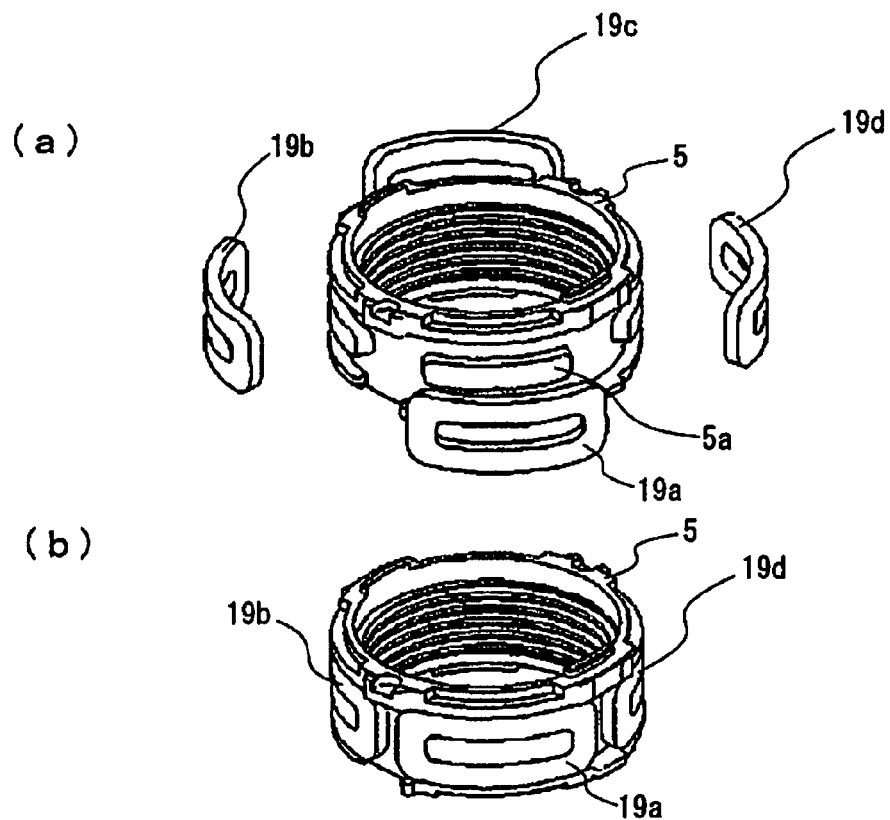
FIG. 3 is a view of a lens support according to the first embodiment, in which FIG. 3 (a) shows a state before attaching coils, and FIG. 3 (b) is a perspective view showing a state in which the coils are attached.

As shown in FIGS. 3 and 5, the lens support 5 has a substantially cylindrical shape, and a lens (not illustrated) is fixed to the inner circumferential side thereof. Four coils 19a, 19b, 19c and 19d are attached at regular intervals in a circumferential direction on an outer periphery of the lens support 5.

Each of the coils 19a, 19b, 19c and 19d is rectangular when laterally viewed, and is supported by inserting a protrusion 5a, which is formed on the lens support, into an inside of the coil.

Figure 1:
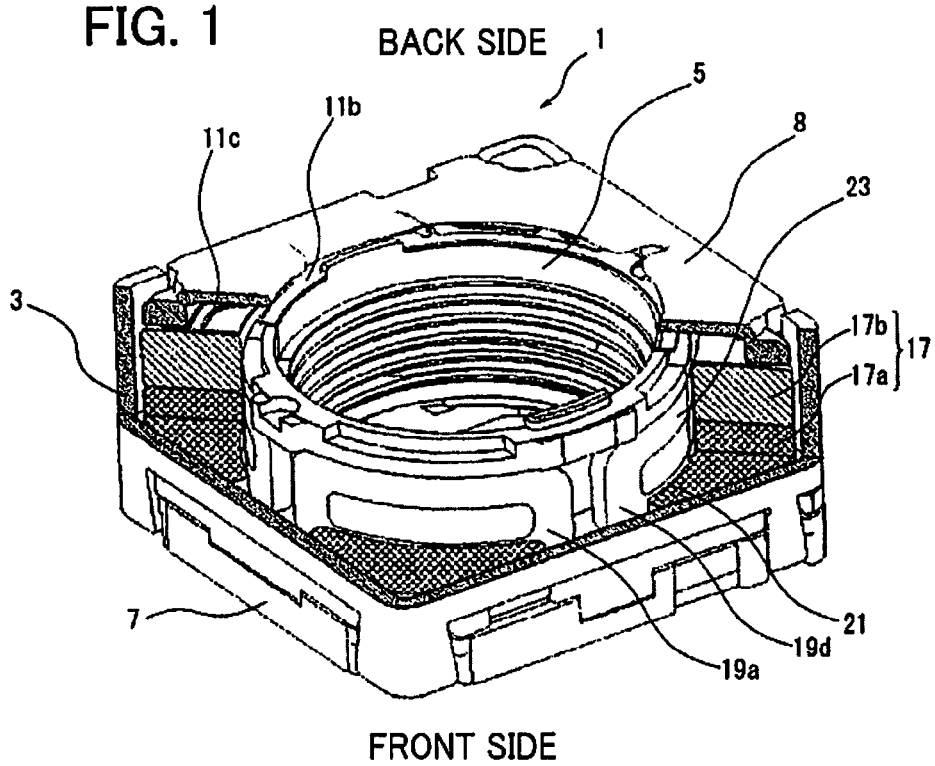
FIG. 1 is a partially cutout perspective view showing a lens driving device according to a first embodiment.
Figure 2:
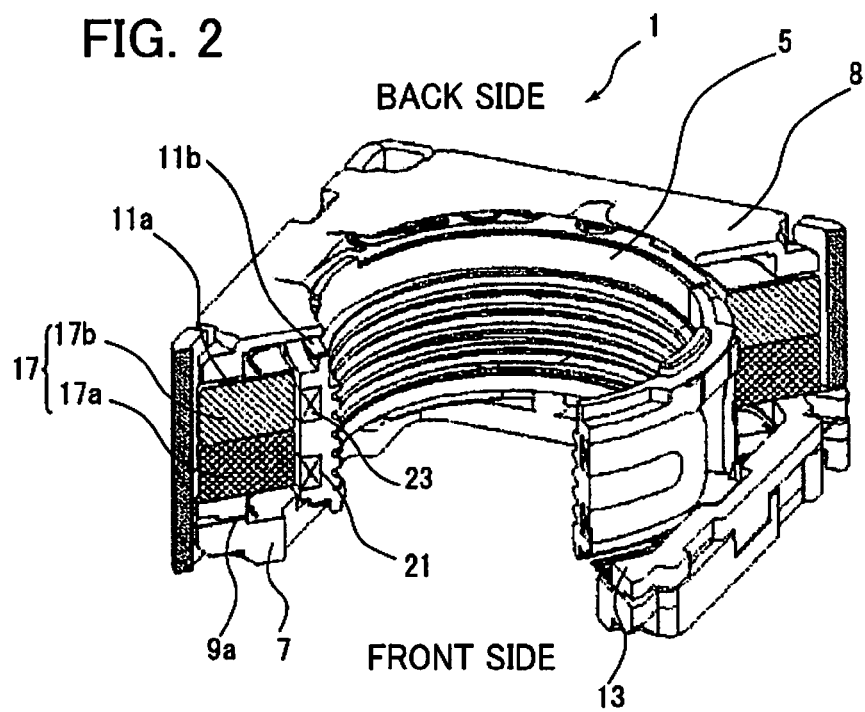
FIG. 2 is a partially cutout perspective view showing the lens driving device according to the first embodiment.

As shown in FIGS. 1 and 2, in each of the coils 19a, 19b, 19c and 19d, an inner periphery of the front side magnet 17a is positioned so as to face a front side portion 21, and an inner periphery of the back side magnet 17b is positioned so as to face a back side portion 23.

Figure 4:
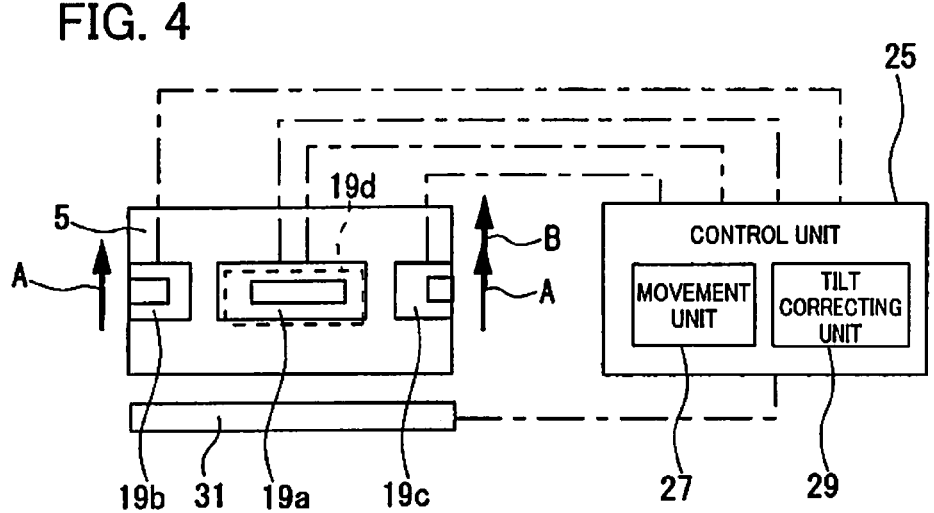
FIG. 4 is a block diagram showing a relationship between the lens support and a control unit according to the first embodiment.
Figure 7:
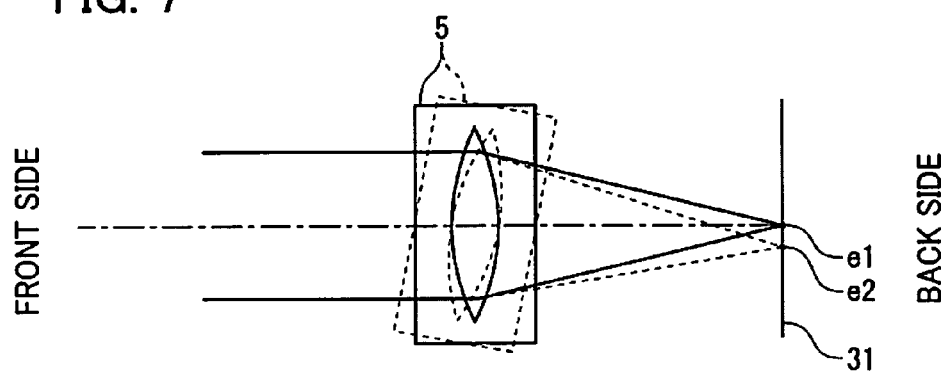
FIG. 7 is a diagram showing an operation of the lens driving device according to the first embodiment.

As shown in FIG. 4, each of the coils 19a, 19b, 19c and 19d is connected to a control unit 25, so that a predetermined amount of electric current is applied thereto from the control unit 25. The control unit 25 is connected to an image sensor 31 disposed on an image formation side of the lens, and as shown in FIG. 7, by detecting a peak of the high frequency components or a peak of the contrast in the image sensor 31, a focusing point e1 and tilt (deviation) e2 of the optical axis are detected. As shown in FIG. 4, a movement unit 27 and an tilt correcting unit 29 are provided to the control unit 25, the movement unit 27 calculates an electric current A to be applied to each of the coils 19a, 19b, 19c and 19d in accordance with an amount of movement of the lens support 5, and the tilt correcting unit 29 calculates a current B to be applied to each of the corresponding coils 19a, 19b, 19c and 19d in order to adjust tilt of the lens support 5 in accordance with tilt of the optical axis of the lens. In addition, in the control unit 25, an electric current of a value of A+B, which has been calculated in the movement unit 27 and the tilt correcting unit 29, is applied to each of the coils 19a, 19b, 19c and 19d.

As shown in FIG. 5, a front side spring 9 is tabular in a natural state before assembly, and is configured with: an outer circumferential side portion 9a is formed in rectangular when viewed in a planar way; an inner circumferential side portion 9b is shaped like a circular arc when viewed in a planar way and is disposed to an inner circumference of the outer circumferential side portion 9a; and each arm portion 9c that connects the inner circumferential side portion 9b and the outer circumferential side portion 9a.

Similarly, a back side spring 11 is tabular in a natural state before assembly, and is configured with: an outer circumferential side portion 11a formed in rectangular when viewed in a planar way; an inner circumferential side portion 11b that is shaped like a circular arc when viewed in a planar way and is disposed to an inner circumference of the outer circumferential side portion 11a; and each arm portion 11c that connects the inner circumferential side portion 11b and the outer circumferential side portion 11a.

The outer circumferential side portion 9a of the front side spring 9 is sandwiched between the frame 7 and a front side spacer 13, and the inner circumferential side portion 9b is fixed to a front end of the lens support 5. The outer circumferential side portion 11a of the back side spring 11 is sandwiched between the base 8 and a back side spacer 15, and the inner circumferential side portion 11b is fixed to a back end of the lens support 5. As a result, the lens support 5 is supported so as to be able to move freely in the front-back direction by way of the front side spring 9 and the back side spring 11.

In addition, as the lens support 5 is moved forward, the lens support 5 is stopped at a position where a resultant force of biasing forces of the front side spring 9 and the back side spring 11 is balanced with an electromagnetic force generated among the coils 19a, 19b, 19c and 19d and the magnets 17a and 17b.

Next, assembly, operations and effects of the lens driving device 1 according to the embodiment of the present invention are described.

In the assembly of the lens driving device 1, as shown in FIGS. 1 and 5, the base 8, the back side spring 11, the back side spacer 15, the lens support 5 in which the coils 19a, 19b, 19c and 19d are fixed to the outer periphery thereof (see FIG. 3 (b)), the yoke 3 in which the magnets 17a and 17b are fixed to the inner corners thereof, the front side spacer 13, the front side spring 9 and the frame 7 are assembled and fixed in this order.

Each input terminal and output terminal of the coils 19a, 19b, 19c and 19d are connected to the control unit (power supply) 25, and the control unit 25 individually controls a direct current to be applied to each of the coils 19a, 19b, 19c and 19d.

As shown in FIG. 4, when driving the lens driving device 1 according to the present embodiment, while comparing peaks of the high frequency components (contrast) that the control unit 25 receives from the image sensor 31, the lens support 5 is linearly moved to the focusing point position e1 (see FIG. 7).

When the lens support 5 is linearly moved, it is stopped at a position where an electromagnetic force generated between the magnets 17a and 17b, which is generated by applying the current A of the same value to each of the coils 19a, 19b, 19c and 19d from the control unit 25, is balanced with a resultant force of biasing forces of the front side spring 9 and the back side spring 11.

It should be noted that, in each of the coils 19a, 19b, 19c and 19d, the directions of the electric currents flowing in the front side portion 21 and the back side portion 23 are opposite from each other, and the magnetic poles of the facing magnets 17a and 17b are made different therefrom, a result of which the direction of the electromagnetic forces thereof together is the same, and a double electromagnetic force (thrust) can be obtained. In other words, an electric current to be applied for obtaining the same electromagnetic force (thrust) can be halved as compared to a case of using only one magnet.

On the other hand, as shown by way of e2 in FIG. 7, in a case in which tilt (focal deviation) is occurring in the optical axis, the lens support 5 needs to be inclined in order to correct the optical axis. In this case, by applying an electric current A+B, to which a current value B has been added, to (one, two or three) predetermined coils among the coils 19a, 19b, 19c and 19d, the attitude (tilt) of the lens support 5 is controlled. It should be noted that an electric current A−B, from which the current value B has been subtracted, may be applied thereto, so that the electric current to be applied may be made relatively different.

Moreover, the tilt correction of the optical axis of the lens support 5 may be performed after moving the lens support 5 to a predetermined position, and may also be performed by moving the lens support 5 while controlling the tilt (the current value A+B for controlling the tilt is used as the electric current to be applied to each of the coils since such movement).

In the first embodiment, the coils 19a to 19d, which are disposed at regular intervals in the circumferential direction on the outer periphery of the lens support 5, and the two magnets 17a and 17b facing them each give a thrust to the lens support 5; therefore, two functions of moving the lens support 5 in the optical axis direction and correcting the optical axis of the lens can be achieved at the same time.

The coils 19a to 19d and the magnet portions 17, which provide a thrust in each portion in the circumferential direction of the lens support 5, are disposed on the outer periphery of the lens support 5, and a coil and a magnet are not disposed in the optical axis direction of the lens unlike the prior art; therefore, the dimension of the front-back direction (optical axis direction) of the lens support 5 can be reduced as compared to the prior art.

Since the optical axis correction can be easily performed, the accuracy and assembly accuracy required for the lens support 5 and the parts (for example, the springs 9 and 11), etc. holding the lens support 5 so as to move freely can be reduced, and in addition, defects of these parts and defects of the lens driving device 1 can be reduced.

Although another embodiment of the present invention is described as follows, the portions that achieve the same operations and effects as the aforementioned first embodiment are assigned with the same reference symbols in the following description, and the detailed descriptions of such portions are omitted, and points different from the first embodiment are mainly described.

Figure 8:
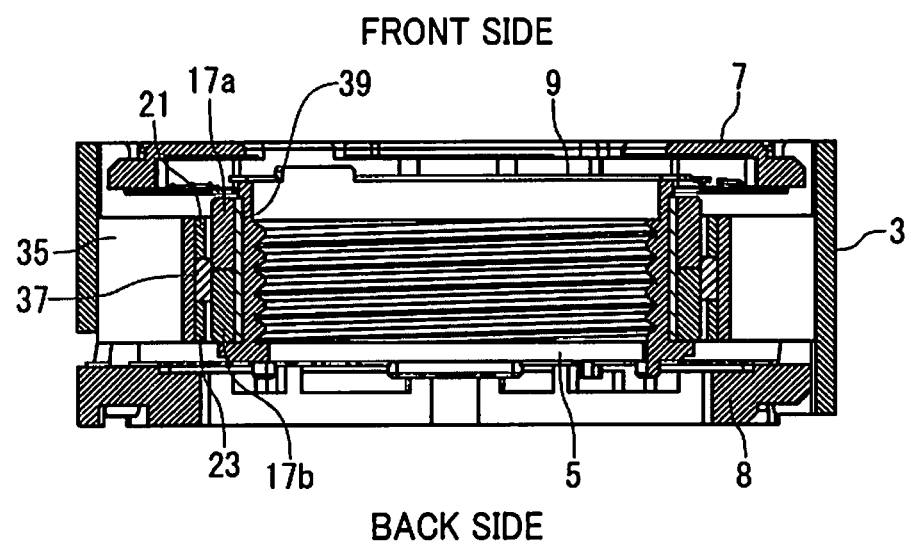
FIG. 8 is a vertical cross-sectional view of a lens driving device according to a second embodiment.
Figure 9:
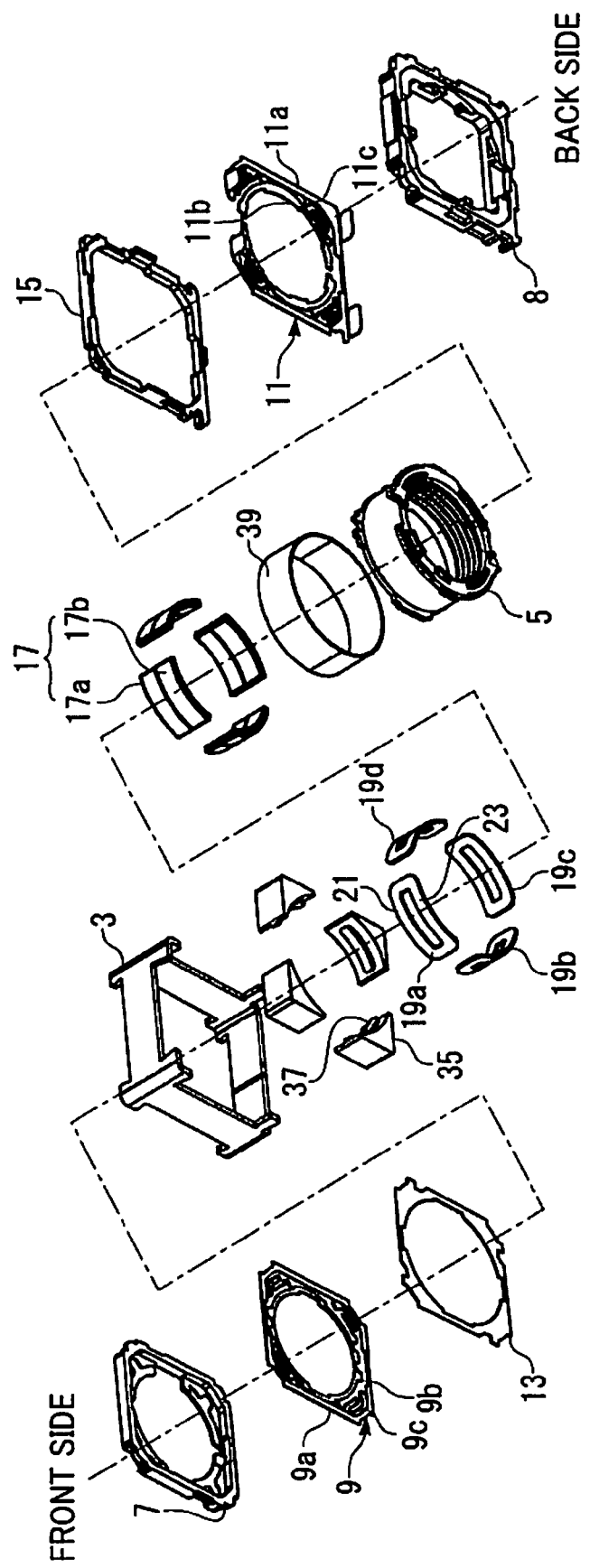
FIG. 9 is an exploded perspective view of the lens driving device according to the second embodiment.

A second embodiment of the present invention is described with reference to FIGS. 8 and 9. In the second embodiment, coil retaining members 35 are provided to respective corners of the inner circumference of the yoke 3, and the coils 19a to 19d are fixed to the coil retaining members 35, respectively. The coil retaining members 35 are provided with protrusions 37 protruding to the inner circumferential side, and are supported by inserting the protrusions 37 into the inside of the coils 19a to 19d.

An auxiliary yoke 39 of a cylindrical shape is provided to the lens support 5, and each of the magnet portions 17 is provided to the outer periphery of the auxiliary yoke 39, in a position facing each of the toroidal coils 19a to 19d. The magnet portions 17 are configured with the front side magnet 17a and the back side magnet 17b both shaped like a belt.

In other words, the second embodiment is different from the first embodiment in that the magnet portions 17 are fixed to the lens support 5, and the coils 19a to 19d are fixed to the fixed members (the yoke 3, the frame 7 and the base 8).

According to the second embodiment, the operations and effects similar to those of the first embodiment can be obtained.

The present invention is not limited to the aforementioned embodiments, and can be altered in various ways within a scope that does not depart from the sprit of the present invention.

The number of the coils 19a to 19d and the magnet portions 17 provided around the lens support is not limited to four, and may be three or five, and the number thereof is not limited.

The two magnets 17a and 17b are disposed in the front and back in the magnet portions 17, and the magnets 17a and 17b are provided so as to face the front side portion 21 and the back side portion 23, respectively, of the coils 19a, 19b, 19c and 19d; however, a configuration may be employed in which only one magnet 17a (or 17b) faces any of the front side portion 21 or the back side portion 23.

What is claimed is:

1. A lens driving device, comprising:
a lens support for supporting a lens in an inner circumference;
a plurality of coils disposed at regular intervals in a circumferential direction on an outer periphery of the lens support and having a degree of curvature corresponding to the outer periphery;
a fixed member that is in the shape of a polygonal barrel and disposes the lens support in the inner circumference, and supports the lens support so as to move freely in an optical axis direction of the lens; and
magnet portions that are provided at corners of the fixed member, and face the coils, respectively,
wherein an electric current of equal current value is applied to each of the coils when moving the lens support in the optical axis direction,
current values of the electric current applied to predetermined coils are varied when correcting tilt of the optical axis of the lens,
each of the coils is a loop when viewed laterally, and includes a first side portion, a second side portion in the optical axis direction, a right side portion and a left side portion which continue to the first side portion and the second side portion of each of the coils and face a center portion between neighboring corners of the fixed member, the magnet portions include a first side magnet that faces a first side portion of each of the coils, and a second side magnet that faces a second side portion of each of the coils, and magnetic poles of the first side magnet and the second side magnet are different from each other.

2. An autofocus camera, comprising:

the lens driving device according to claim 1; and an image sensor that is provided to an image formation side of the lens of the lens support.

3. A camera-equipped mobile terminal, comprising the autofocus camera according to claim 2.

4. A lens driving device, comprising:

a lens support for supporting a lens in an inner circumference;

a plurality of magnet portions disposed at regular intervals in a circumferential direction on an outer periphery of the lens support;

a fixed member that is in the shape of a polygonal barrel and disposes the lens support in the inner circumference, and supports the lens support so as to move freely in an optical axis direction; and coils that are provided to the fixed member, and face the magnet portions of the lens support, respectively, and having a degree of curvature corresponding to an outer periphery of the lens support, wherein the magnet portions are provided at corners of the fixed member, an electric current of equal current value is applied to each of the coils when moving the lens support in the optical axis direction, current values of the electric current applied to predetermined coils are varied when correcting tilt of the optical axis of the lens, each of the coils is a loop when viewed laterally, and includes a first side portion, a second side portion in the optical axis direction, a right side portion and a left side portion which continue to the first side portion and the second side portion of each of the coils and face a center portion between neighboring corners of the fixed member, the magnet portions include a first side magnet that faces a first side portion of each of the coils, and a second side magnet that faces a second side portion of each of the coils, and magnetic poles of the first side magnet and the second side magnet are different from each other.

5. An autofocus camera, comprising:

the lens driving device according to claim 4; and an image sensor that is provided to an image formation side of the lens of the lens support.

6. A camera-equipped mobile terminal, comprising the autofocus camera according to claim 5.

7. The lens driving device according to claim 1, wherein an outer circumferential side of each magnet portion is wrapped by respective corners of the fixed member and an inner circumferential side of each magnet portion is a circular arc and faces the respective coil in parallel.

8. The lens driving device according to claim 4, wherein the magnet portions extend across respective corners, of the fixed member.

* * * * *